United States Patent
Raskar

(10) Patent No.: US 6,781,591 B2
(45) Date of Patent: Aug. 24, 2004

(54) BLENDING MULTIPLE IMAGES USING LOCAL AND GLOBAL INFORMATION

(75) Inventor: Ramesh Raskar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 135 days.

(21) Appl. No.: 10/265,890

(22) Filed: Oct. 7, 2002

(65) Prior Publication Data

US 2003/0034988 A1 Feb. 20, 2003

Related U.S. Application Data

(63) Continuation-in-part of application No. 09/929,980, filed on Aug. 15, 2001, now Pat. No. 6,677,956.

(51) Int. Cl.[7] .................................................. G09G 5/00
(52) U.S. Cl. ........................ 345/582; 345/629; 345/639
(58) Field of Search ................................ 345/422, 582, 345/622, 629, FOR 136, 216

(56) References Cited

U.S. PATENT DOCUMENTS

| | | | |
|---|---|---|---|
| 5,930,410 A | * | 7/1999 | Webb et al. ................ 382/312 |
| 2004/0012603 A1 | * | 1/2004 | Pfister et al. ............... 345/582 |

* cited by examiner

Primary Examiner—Matthew C. Bella
Assistant Examiner—G. F. Cunningham
(74) Attorney, Agent, or Firm—Dirk Brinkman

(57) ABSTRACT

A method blends multiple input images into an output image for any arbitrary view. In the output images, pixels that are produced from only a single input pixel are identified. The weight of the single pixels is set to one. For each remaining pixel in the input images with unassigned weights distances to an image and a depth boundary are measured, and proportional weight, in a range from zero to one, for these remaining pixels are set proportional to the minimum of the two distances. Then, each input image is rendered to the output image according to the blending fields.

12 Claims, 4 Drawing Sheets

For each output pixel $x$,
 For each input image $i$,
  $angle_i$ = deviation of input ray from output ray $x$
 Find $k$ smallest angles
 For each input image $i$ in $k$-nearest neighbors,
  $w_i(x) = \max(0, (1/angle_i) * (1 - angle_i / angle_k))$

For each input image $i$,
　For each pixel $j$ in image $i$,
　　Splat in output image
　　and store $d_i(j)$, view vector and view depth
For each pixel $x$ in output image
　Eliminate invisible contributions
　Find $w(x_i)$ for $k$-nearest views
　Find normalized weight
　$W_i(x_i) = (w_i(x_i) * d_i(x_i)) / \Sigma_i (w_i(x_i) * d_i(x_i))$ for $i = 1..k$
　$OuputImage(x) = \Sigma_i Output_i(x_i) * W_i(x_i)$

*Fig. 4*

BLENDING MULTIPLE IMAGES USING LOCAL AND GLOBAL INFORMATION

RELATED APPLICATION

This is a continuation-in-part of U.S. patent application Ser. No. 09/929,980 filed by Raskar et al., on Aug. 15, 2001 now U.S. Pat. No. 6,677,956.

FIELD OF THE INVENTION

The present invention relates generally to rendering images, and more particularly to blending overlapping images into a single view output image.

BACKGROUND OF THE INVENTION

The appearance of a scene can be described through all light rays (2D) that are emitted from every 3D point in the scene, generating a 5D radiance function, also called the "plenoptic" function. In a transparent medium, the plenoptic function is reduced to four dimensions. In practice, the plenoptic function is sampled from discrete calibrated camera views, and those radiance values that are not sampled have to be represented by interpolating the recorded ones, sometimes with additional information on physical restrictions.

Often, an object in the scene is assumed to be Lambertian, meaning that each point on the object has the same radiance value in all possible directions. This implies that two viewing rays have the same color value if they intersect at a surface point. If specular effects occur, this is no longer true. Then, two viewing rays have similar color values only if their directions are similar and their point of intersection is near the real surface point. To construct a new image of the scene for a virtual camera, i.e., an arbitrary view, one has to determine those input rays that are closest, in the above sense, to those of the virtual camera. The closer an input ray is to a desired ray, the greater is its contribution to the output color value.

Image-based rendering (IBR) is a popular alternative to traditional three-dimensional graphics. With IBR, it is possible to generate output images from new views that are not part of the input images. Two examples of effective IBR methods are view-dependent texture mapping (VDTM) and light field/lumigraph approaches. Light field, lumigraph and concentric mosaic require a large collection of input images from multiple cameras, but they make few, if any, assumptions about the geometry of the scene.

In contrast, VDTM assumes a relatively accurate geometric model of the scene, but requires only a small number of images from input cameras that can be at arbitrary locations. Both methods interpolate color values for an output pixel as some weighted combination of input pixels.

In VDTM this interpolation is performed using a geometric proxy model to determine which pixel from each input image "corresponds" to the desired pixel in the output image. Of these corresponding pixels, those that are closest in angle to the desired pixel are weighted to make the greatest contribution to the interpolated result.

The blending operation ensures that the influence of a single input image on the final rendering is a smoothly varying function across the output image plane, or, equivalently, across the geometry representing the scene. These smooth weighting functions combine to form a "blending field" that specifies how much contribution the pixels in each input image makes to each pixel in the output image. The reconstructed blending field is then used to blend pixels from the input images to form the pixels of the output image.

The main reasons for blending images are lack of photometric agreement in the input images caused by change in camera response or view-dependent appearance of the scene, and small errors in registration and depth maps, i.e., the geometry of the scene. Blending can cause blurring in the output image. However, blending is necessary to mask the unavoidable errors due to the lack of agreement in the input images.

Blending methods can be in image-space, acting on pixel fragments, or they can be in object-space, handling each polygon in the geometric proxy.

Current blending methods use only local information such as "deviations from the closest views" to find blending weights. They include approaches such as view-dependent texture mapping and blending fields used in unstructured lumigraph rendering. Both these and other methods generate smooth spatial and temporal transitions in the output image.

Following are desirable goals for an ideal IBR method. When a desired ray passes through the center of projection of an input camera, it can be trivially reconstructed from the ray database, assuming a sufficiently high-resolution input image and the ray falls within the camera's field-of-view. In this case, an ideal process should return a ray from the input image. An algorithm with epipole consistency will reconstruct this ray correctly without any geometric information. In general, the choice of which input images are used to reconstruct a desired ray should be based on a natural and consistent measure of closeness. In particular, input image rays with similar angles to the desired ray should be used when possible. When one requests a ray with an infinitesimally small distance from a previous ray intersecting a nearby point on the geometric proxy, the reconstructed ray should have a color value that is correspondingly close to the previously reconstructed color. Reconstruction continuity is important to avoid both temporal and spatial artifacts. For example, the contribution due to any particular camera should fall to zero as one approaches the boundary of its field-of-view, or as one approaches a part of a surface that is not seen by a camera due to visibility occlusions.

As described below, methods based only on local information cannot achieve smoothness across depth boundaries. The VDTM method uses a triangulation of the directions to input cameras to pick the "closest three." Even if the proxy is highly tessellated, nearby points can have very different triangulations of the "input camera view map," resulting in very different reconstructions. While this objective is subtle, it is nonetheless important, because lack of such continuity can introduce noticeable artifacts.

Some methods use a very large number of views, and pixels are blended using views that are very similar and captured by the same camera. Such dense sampling avoids most of the artifacts even if the output pixel is blended from a small number of input pixels.

Despite the formalization of the blending problems, the previous IBR methods attempt to solve the problem by considering one-fragment at a time. This only works well when: the surface is diffuse so that radiance is the same in all directions and corresponding pixels have very similar intensities; and there are no occlusion boundaries so that the relative ordering of corresponding pixels in any local neighborhood is the same, resulting in continuous functions without gaps.

Spatial smoothness relates to variation of weights of input images within the output image. Neighboring pixels in the output image should have similar weights if there is no depth boundary. A depth boundary is defined as an area wherein the depth gradient is very large, for example a discontinuity between a foreground and background object in the scene. Temporal smoothness relates to variation of weights of input images at a 3D feature point in the scene in nearby novel views. The weights at a scene feature should change smoothly if the views change smoothly. The guidelines for achieving spatial and temporal smoothness of contributing weights can be stated as follows:

The sum of the intensity weights of corresponding input image pixels is one so that the intensities in the output image are normalized. The weights of an input image along a physical surface should change smoothly in and near overlaps so that the inter-camera intensity differences do not create visible discontinuity in the output image. The distribution of intensity weights within an input image should be smooth if there is no depth discontinuity. There should be epipole consistency and minimal angle deviation. To reduce blurring, unnecessary blending should be avoided by limiting the number of transition regions.

These guidelines suggest solving the blending problem without violating the weight constraints at depth discontinuities and shadow boundaries. It is important to note that, under certain conditions, some of the guidelines may be in conflict and it may not be possible to satisfy all of them. For example, when the boundaries between overlap regions and non-overlap regions meet at a singularity, the blending weights in the local neighborhood of the singularity are not continuous.

Therefore, there is a need for a method that can blend images that does not have the problems stated above.

SUMMARY OF THE INVENTION

A method blends multiple input images into an output image for any arbitrary view. In the output images, pixels that are produced from only a single input pixel are identified. The weight of the single pixels is set to one.

For each remaining pixel in the input images with unassigned weights, distances to an image and a depth boundary are measured, and proportional weights, in a range from zero to one, for these remaining pixels are set proportional to the minimum of the two distances. Then, each input image is rendered to the output image according to the blending fields.

BRIEF DESCRIPTION OF THE DRAWINGS

FIG. 2 is pseudo-code of a step to determine view-dependent blending weights for the blending method according to the invention;

FIG. 4 is pseudo code for a rendering step of the blending method according to the invention.

DETAILED DESCRIPTION OF THE PREFERRED EMBODIMENT

When rendering multiple, overlapping input images of a scene to render an output image, perhaps from an arbitrary point of view, spatial smoothness relates to variation of weights of the input images to produce the output image. Therefore, neighboring pixels in the output image should have similar weights when there is no depth discontinuity. Temporal smoothness relates to variation of weights at a 3D feature point in the scene at nearby novel views. The weights at a scene feature should change smoothly when the views change smoothly. The guidelines for achieving spatial and temporal smoothness of contributing weights can be stated as follows.

The sum of the intensity weights of corresponding pixels of input images is one so that the intensities in the output image are normalized. The weights of input image along a physical surface should change smoothly in and near image overlaps so that the inter-camera intensity differences do not create visible discontinuity in the output image. The distribution of intensity weights within an input image should be smooth if there is no depth discontinuity. This requires epipole consistency and minimal angle deviation. To reduce blurring, unnecessary blending should be avoided by limiting the number of transition regions These guidelines imply that the blending problem should be solved without violating the weight constraints at depth boundaries or shadow boundaries. It is important to note that, under certain conditions, some of the guidelines may be in conflict and it may not be possible to satisfy all of them.

For example, when the boundaries between overlap regions and non-overlap regions meet at a singularity, the blending weights in the local neighborhood of the singularity are not continuous.

Figure 1:
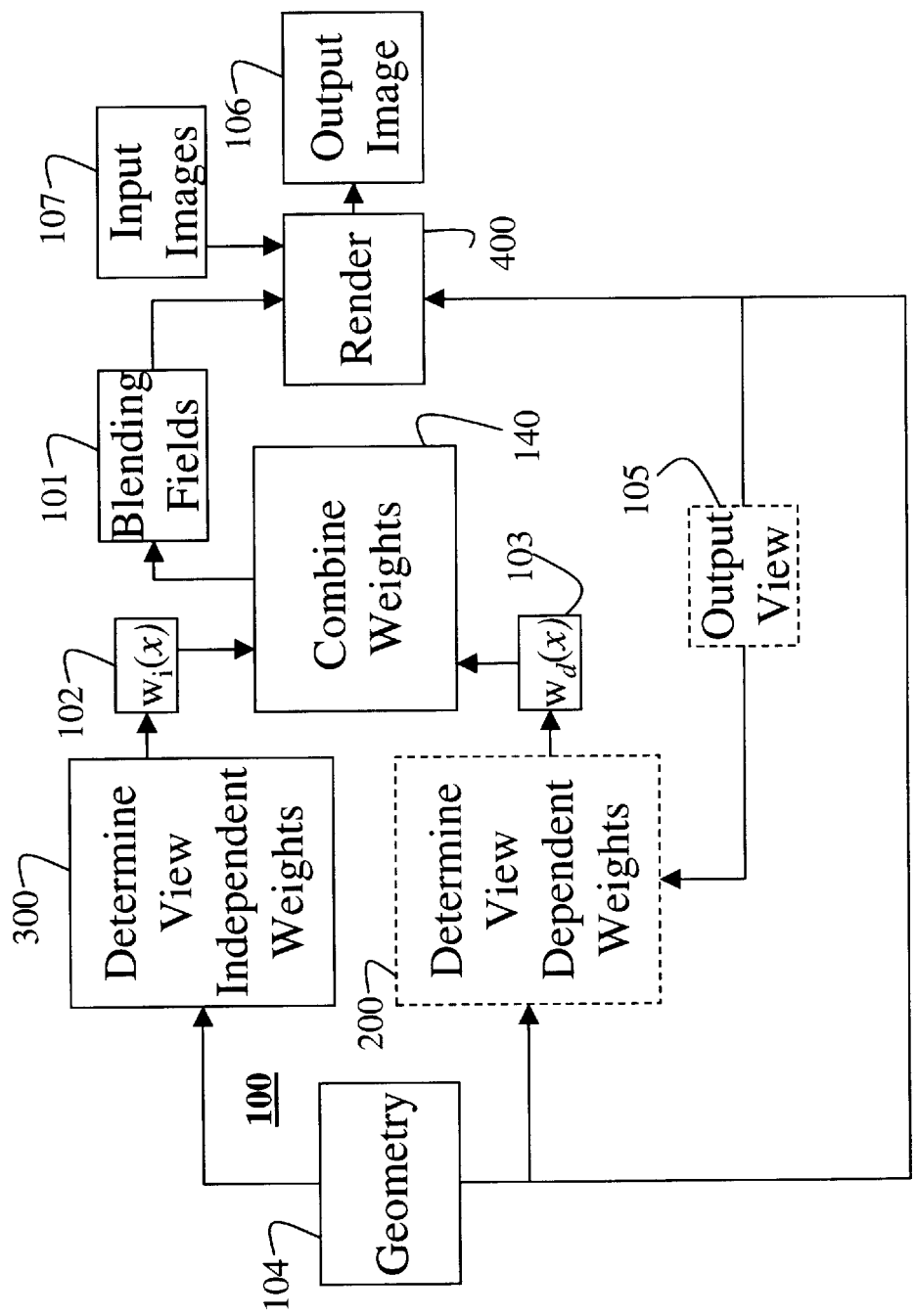
FIG. 1 is a flow diagram of a method for blending multiple images into a single output image according to the invention.

As shown in FIG. 1, the blending and rendering method 100 according to the invention uses an image-space approach. The method 100 operates on input images 107 and a geometry 104 to generate a desired output image 106, either view-independent or view-dependent. Note, the input images can be of real or synthetic scenes. The geometry 104 indicates how the pixels of the input images 107 geometrically relate to each other, for example, the geometry includes image registration or depth information for the various pixels in the input images. The geometry does not include any color information.

A blending field 101 according to the invention is determined from view-independent calculations 300 for view-independent weights $w_i(x)$ 102, and optionally, from view-dependent calculations 200 for a view-dependent weights $w_d(x)$ 103.

There is one blending field for each input image. During rendering each input image is "blended" into the output image according to the weights in its corresponding blending field.

The calculations 300 of the view-independent weights 102 are based only on global relationships among the input images and scene features, that is the geometry 104. The calculations 300 of the view dependent weights $w_d(x)$ 103 primarily consider the point of view 105 for the output image and visibility parameters as defined by the geometry 104. Other parameters that can be included are resolution, or sampling density. View point dependent parameters are due to relationship between the output image 106 and the input images 107.

As described below, the blending field 101 can combine 140 the view-independent and the view-dependent weights using a normalized dot product. The view-independent calculations 300 take into consideration global visibility constraints, while view-dependent calculations 200 are performed per fragment of the output image. A fragment can be an image pixel or a polygon of the geometric proxy.

In scenes with significant depth discontinuities, i.e., depth boundaries, the view-independent calculations 300 are more complex than the view-dependent calculations 200. For static scenes, the view-independent contribution can be pre-processed.

As described above, traditional blending methods use the distance to a nearest invisible or boundary pixel to find the blending weight. Typically, the contribution due to any particular input image decreases to zero as the boundary of its field-of-view is approached.

Instead, the invention uses the notion of distance to a nearest image boundary or nearest depth boundary, selecting the minimum of these two distances. A depth boundary can be referred to as a depth discontinuity.

First, output pixels corresponding to regions seen in only a single input pixel in any of the input images are identified. The view-independent weights of these single input pixels are assigned a value of 1.0 in the corresponding blending field. Then, for each remaining pixel in the input images, i.e., those pixels with unassigned view-independent weights, a shortest distance of a path from the pixel to an image boundary or depth boundary is measured. In this step, paths that cross overlap boundaries are ignored. These remaining pixels are assigned view-independent weight proportional to the minimum distance of these two distances. Even under view-dependent intensities, this generates smooth transitions in the presence of shadows and fragmented overlaps.

FIG. 2 shows pseudo-code 200 for determining view-dependent weights $w_d(x)$ 103. The view-dependent calculations 200 are dependent on the maximum angular deviation of an input ray from an output ray. For each output pixel, corresponding pixels in the input images of the k-nearest camera views in which the output pixel is visible are selected. The assignment of view-dependent weights $w_d(x)$ 103 is based on the maximum angular deviations with respect to the k-nearest neighbors.

The view-dependent blending weights $w_d(x)$ do not need to be normalized across input images because the weights are normalized after the dot product 140 with the view-independent weights. This weighting scheme also ensures the near-view epipole consistency guideline stated above. As the deviation approaches zero, i.e., the output ray is an epipole, then the view-dependent weight approaches one. The view-dependent weights gradually approaches zero as ray approaches the image boundary of the first k-nearest views. $Angle_k$ denotes the maximum angle among the k neighbors.

Figure 3:
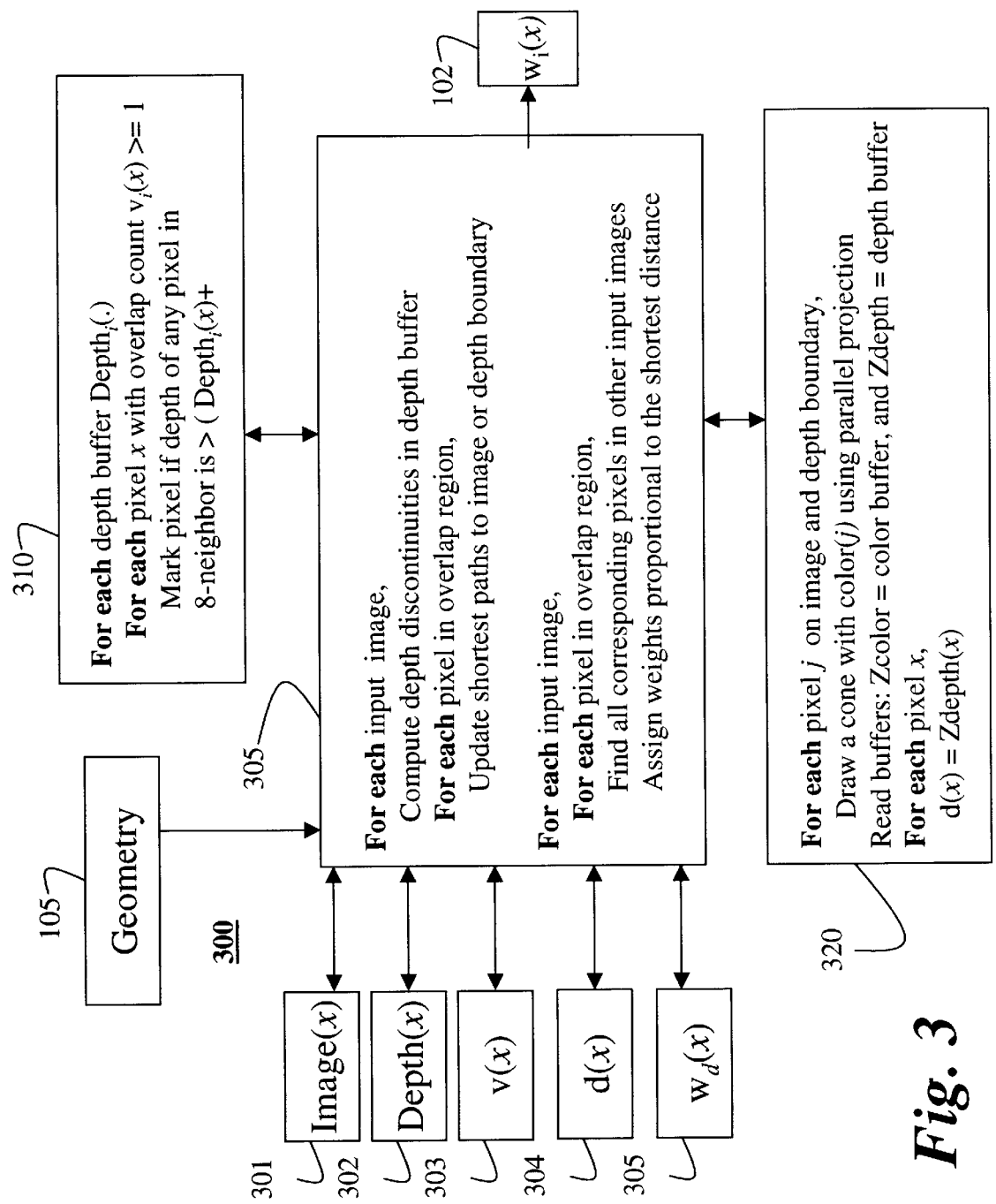
FIG. 3 is pseudo-code of a step to determine view-independent blending weights for the blending method according to the invention.

FIG. 3 shows the view-independent weights calculation 300 in greater detail, with a main step 305. For a practical real time implementation, five buffers are used for each input image 107: an image buffer, Image(x), 301, a depth buffer, Depth(x), 302, an overlap buffer, v(x), 303 to record overlaps, a distance buffer, d(x), 304, and a weight buffer, $w_i(x)$, to store weight values for pixel x.

The depth buffer 302 is a 2D array of depth values for the input images. If a geometric proxy is used, the depth buffer can be calculated by rendering the geometric proxy from the camera's viewpoint and reading back the rendered depth buffer. The overlap buffer 303 contains integer values to indicate the number of overlapping images views for each pixel. The overlap regions, i.e., pixel counts of two or more, are determined using conventional shadow-buffer technique. Step 310 shows how to find the depth boundaries in the depth buffer 302.

Due to the inequality, the depth boundary pixels are only on a nearest surface and do not result in double boundaries at depth discontinuity. The threshold $Depth_t(+)$ used to eliminate errors due to lack of depth precision.

The independent weight calculations 300 generate a smooth function based on the "shortest path to a boundary" where the boundary is either the image or depth boundary.

In the absence of depth discontinuities, this function will be smooth across the input image. By ignoring paths that cross overlap boundaries, the scene smoothness condition is enforced. Hence, the independent blending weights are discontinuous only at the depth boundaries in image space but are continuous along the scene geometry. If a view-dependent output image is desired, the view-independent weights $w_i(x)$ 102 are combined 140 with the corresponding view-dependent weights, $w_d(x)$ 103, which are also smooth. The dot product of these two weighting functions is also smooth except at the depth boundaries.

The difficult part of the view-independent weight assignment is the measurement of the distances along the shortest paths, because the paths may not always be along straight lines.

The shortest path problem is well-studied in the field of computational geometry. One approach is based on generalized Voronoi diagrams. Voronoi diagrams are commonly used for applications such as path planning in potential field and for avoidance of obstacle nodes.

Motion planning is a fundamental problem, with applications to the animation of digital actors, maintainability studies in virtual prototyping, and robot-assisted medical surgery. The classic "Piano Mover" problem involves finding a collision-free path for a robot moving from one location and orientation to another in an environment filled with obstacles. The underlying idea is to treat the obstacles as repulsion nodes. The Voronoi boundaries then provide paths of maximal clearance between the obstacles. Due to the practical complexity of computing generalized Voronoi diagrams, the applications of such planners have been limited to environments composed of a few simple obstacles.

Recently, hardware based approaches have been used for greedy path planning processes with gradient approach. Although relatively fast, the encoding of the shortest path for all points with respect to attraction nodes and repulsion nodes is difficult. In the context of the present invention, attraction nodes would be the overlap boundaries and repulsion nodes the image and depth boundaries.

Instead, the invention uses an approximation of the distance along the shortest path. The approximation satisfies the following three goals: weights near overlap boundary in overlap region are close to one, weights near depth boundary in overlap region are close to zero, and weights for pixels in regions in between transition smoothly.

The invention uses graphics hardware to compute Voronoi diagrams. The idea is to render a cone to approximate each node's distance function. A node can be a pixel on an image boundary or a depth boundary. Each node is assigned a unique color ID, and the corresponding cone is rendered in that color using a parallel projection. When rendering a polygonized cone, the polygon rasterization in the graphics hardware reconstructs all distances across the image plane using linear interpolation of depth across polygons and the Z-buffer depth comparison operation.

The Z-buffer depth test compares the new depth value to the previously stored value. If the new value is less, then the Z-buffer records the new distance, and the color buffer records the site's ID. In this way, each pixel in the frame buffer will have a color corresponding to the site to which it is closest, and the depth-buffer will have the distance to that site. In order to maintain a single-pixel-accurate Voronoi diagram, a finely tessellated cone needs to be rendered.

Let $Z(x)$ and $z(x)$ denote the nearest depth boundary node and distance to that node, for a pixel x. Note that these Euclidean distances are along straight lines, as defined by Voronoi diagrams. The depth-buffer values are converted to object-space depth distances, which in this case correspond to distances from boundary pixels in pixel-units.

To avoid the depth boundary nodes, the depth values $z(x)$ need to be updated. Let $d(x)$ denote the updated $z(x)$, i.e., the approximate distance that is proportional to the distance to the nearest image or depth boundary. The pseudo-code for computing the distances for view-independent weights for each input image is shown in step 320.

The steps for rendering 400 are shown in FIG. 4. Let $x_i$ denote the corresponding pixel for a pixel x in the input image i. As stated above, this step can be modified to use any type of fragments. Instead of pixels, one can use polygons from geometric proxy. The procedure is somewhat simpler than methods where multiple weights per pixel have to be assigned and later distinguished depending on depth values. To eliminate invisible contributions, before splatting, the preferred embodiment simply renders the geometric proxy to update the depth buffer in the output image. The summation after dot product on the last line of the step is achieved with an accumulation buffer in the graphics hardware. The splatting here is conventional, typically a projection of a Gaussian distribution of the pixel's color value. Other splatting techniques may also be used.

The invention effectively provides a new blending method to influence pixel intensities for merging multiple input images into an output image for an arbitrary point of view. The invention uses global constraints for handling feathering across depth boundaries. In the method, each blending weight is made up of a view-independent and optional view-dependent component. Approximation of the desired view-independent weights are calculated using conventional rendering hardware. The method is sufficiently general to be used for blending operations in many types of interpolation. These include synthesis from surface light fields, re-lighting of image-based scenes, and novel view generation from sampled BRDF values.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

What is claimed is:

1. A method for blending a plurality of input images into a output image, comprising:

identifying each output pixel in the output image that is produced from only a single input pixel in any of the input images;

setting a view-independent weight of each single input pixel to one in a blending field associated with the input image containing the single input pixel;

measuring for each remaining output pixel in each input image a distance to an image boundary and a distance to a depth boundary;

selecting a minimum of the two distances;

setting the view-independent weight, in a range from zero to one, of each remaining input pixel proportional to the minimum distance in the blending field associated with the remaining input pixel; and rendering each input image according to the associated blending field to produce a view-independent output image.

2. The method of claim 1 wherein a point of view of the output image is arbitrary.

3. The method of claim 2 wherein the point of view of the output image is different than a point of view of any of the input images.

4. The method of claim 1 further comprising:

normalizing the view-independent weights in the blending fields.

5. The method of claim 4 wherein the view-independent weights are based on global relationships among the input images.

6. The method of claim 4 further comprising:

setting a view-dependent weight for each input pixel in each input image.

7. The method of claim 6 wherein the view-dependent weights consider a field-of-view of the output image.

8. The method of claim 6 wherein the view-independent weights and the view-dependent weights are combined in the blending field by a normalized dot product.

9. The method of claim 6 wherein the view dependent weights are dependent on a maximum angular deviations between input rays of the input pixels and output rays of corresponding output pixels.

10. The method of claim 1 wherein the distances are measured using Voronoi diagrams.

11. The method of claim 10 wherein a cone is rendered for each pixel using graphics hardware to approximate a distance function.

12. The method of claim 8 further comprising:

rendering each input image according to the associated blending field having the combined weights to produce a view-dependent output image.

* * * * *